(12) United States Patent
Naz et al.

(10) Patent No.: US 8,774,013 B2
(45) Date of Patent: Jul. 8, 2014

(54) FIELD DEPLOYABLE MESSAGE COMPROMISER

(75) Inventors: Nausheen Naz, Ottawa (CA); Csaba Marton, Ottawa (CA); Suat R. Eskicioglu, Ottawa (CA); Manikka Thyagarajan, Ottawa (CA); Michael H. Lashley, Chateauguay (CA)

(73) Assignee: Alcatel Lucent, Paris (FR)

( * ) Notice: Subject to any disclaimer, the term of this patent is extended or adjusted under 35 U.S.C. 154(b) by 353 days.

(21) Appl. No.: 13/149,556

(22) Filed: May 31, 2011

(65) Prior Publication Data

US 2012/0307643 A1    Dec. 6, 2012

(51) Int. Cl.
*G01R 31/08*    (2006.01)
(52) U.S. Cl.
USPC .......................................................... 370/244
(58) Field of Classification Search
CPC ................................ G06F 15/16; H04L 12/26
USPC ......... 370/240, 241, 419, 420, 410, 411, 412, 370/465, 466, 225, 242; 709/234; 455/67.1; 710/105
See application file for complete search history.

(56) References Cited

U.S. PATENT DOCUMENTS

| | | | |
|---|---|---|---|
| 2012/0307626 A1* | 12/2012 | Thyagarajan et al. | 370/225 |
| 2012/0307642 A1* | 12/2012 | Naz et al. | 370/241 |
| 2012/0309320 A1* | 12/2012 | Thyagarajan et al. | 455/67.11 |
| 2012/0311178 A1* | 12/2012 | Naz et al. | 709/234 |
| 2012/0311205 A1* | 12/2012 | Thyagarajan et al. | 710/105 |

* cited by examiner

*Primary Examiner* — Hanh N Nguyen
(74) *Attorney, Agent, or Firm* — Kramer Amado, P.C.

(57) ABSTRACT

A method and apparatus are disclosed for establishing a field deployable message compromiser which is connected between two network elements and identifies and removes predetermined messages from an incoming message stream. Subsequent to removal the test protocol processor may perform one or more of several actions according to the results of statistical calculations. These actions include allowing the message to drop, replacing the message after a delay, replacing the message after altering the payload of the message, and replacing the message after altering the message type. The disclosed field deployable message compromiser is particularly useful for providing a means to perform in situ field testing of network performance indicators under desired statistical conditions.

19 Claims, 6 Drawing Sheets

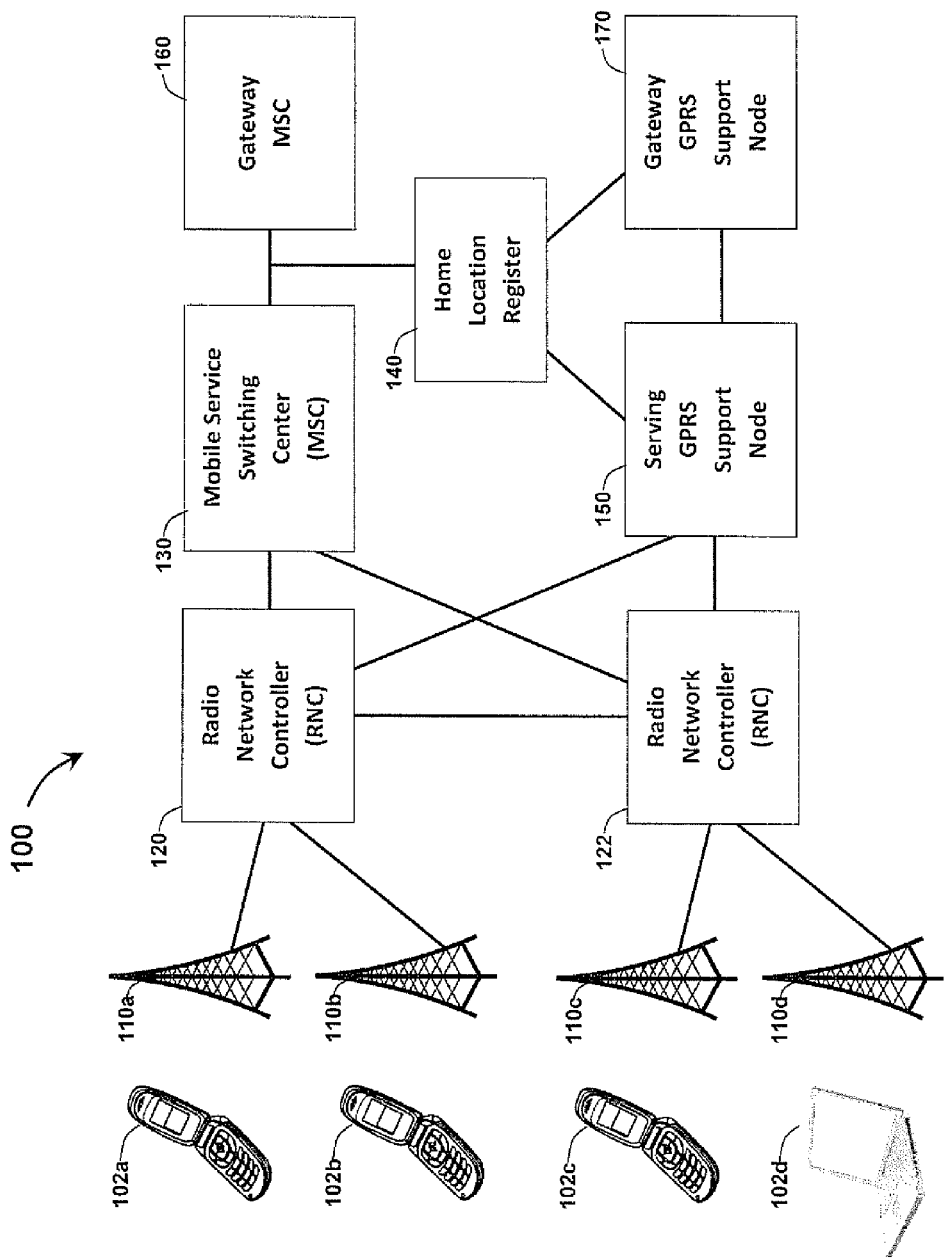

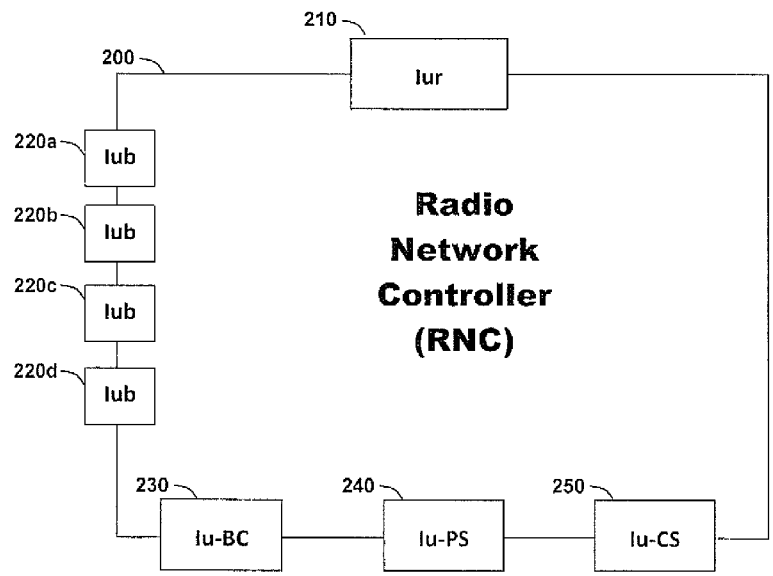
PRIOR ART  FIG. 2
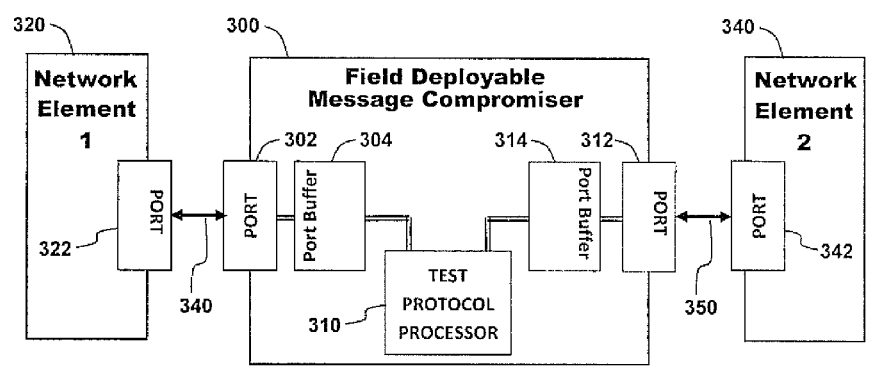
Fig. 3

FIELD DEPLOYABLE MESSAGE COMPROMISER

CROSS-REFERENCE

This application cross-references the following co-pending application, incorporated by reference herein: application Ser. No. 13/149,370, "AUTONOMOUS SELF-DISRUPTING NETWORK ELEMENT" to Naz et al., filed May 31, 2011.

This application cross-references the following co-pending application, incorporated by reference herein: application Ser. No. 13/149,414, "SELF-DISRUPTING NETWORK ELEMENT" to Naz et al., filed May 31, 2011.

This application cross-references the following co-pending application, incorporated by reference herein: application Ser. No. 13/149,473, "MESSAGE FLOW REROUTING FOR SELF-DISRUPTING NETWORK ELEMENT" to Thyagarajan et al., filed May 31, 2011.

This application cross-references the following co-pending application, incorporated by reference herein: application Ser. No. 13/149,473, "MESSAGE FLOW REROUTING FOR AUTONOMOUS SELF-DISRUPTING NETWORK ELEMENT" to Thyagarajan et al., filed May 31, 2011.

This application cross-references the following co-pending application, incorporated by reference herein: application Ser. No. 13/149,316, "FIELD-DEPLOYABLE PROTOCOL MESSAGE INTERCEPTOR" to Thyagarajan et al., filed May 31, 2011.

FIELD OF THE INVENTION

The invention relates to generally to network element equipment testing and is particularly concerned with a field deployable message compromiser configured for autonomous provisioning of test cases suitable for demonstrating the performance of network elements against performance indicators given certain statistical conditions.

BACKGROUND OF THE INVENTION

As demand increases for varying types of applications within mobile telecommunications networks, service providers constantly upgrade their systems in order to reliably provide an expanded functionality. What was once a system designed simply for voice communication has grown into an all-purpose network access point, providing access to a myriad of applications including text messaging, multimedia streaming, and general Internet access. In order to support such applications, providers have built new networks on top of their existing voice networks. As seen in second and third generation networks, voice services must be carried over dedicated voice channels and directed toward a circuit-switched core, while other service communications are transmitted according to the Internet protocol (IP) and directed toward a different, packet-switched core. This led to unique problems regarding application provision, metering and charging, and quality of experience (QoE) assurance.

Call drops and establishment failures are two of the major issues in wireless networks that impact end user experience and cause customer dissatisfaction. Metrics have been defined to track these statistics in the networks to evaluate network performance. These metrics are termed as Network Key Performance Indicators (N-KPI).

Demonstration of Network Key Performance Indicators as impacted by a particular network element is difficult to do. If a particular network element, such as for example a Radio Network Controller (RNC) of the Universal Mobile Telecommunications Services (UTMS) is situated in a test facility, then it is difficult to ensure that the test equipment which is exercising the RNC is providing conditions matching a particular customer network given the variety of network equipment that a given customer's network may present. On the other hand, once the network equipment is deployed into the customer's network the contextual conditions presented are representative, but disentangling the contributions, positive or negative, of the specific network equipment element becomes difficult due to interoperability effects.

In view of the foregoing, it would be desirable to provide a method to test a network element in situ in a customer network. In particular, it would be desirable to provide a means by which the response of a particular network element to a plurality of problematic messaging conditions could be demonstrated under a given statistical regime.

SUMMARY OF THE INVENTION

According to one aspect of the invention there is disclosed a field-deployable message compromiser having a first port having a first port buffer; a second port having a second port buffer; and a test protocol processor having access to the first and second port buffers; wherein the test protocol processor is configured to: in the event that a first protocol message is stored in the first port buffer, remove the first protocol message from the first port buffer; generate a first value according to a first statistical distribution in the event the first protocol message corresponds to a predetermined message type; compare the first value to a first threshold; and if the first value is to one side of the first threshold to immediately store the first protocol message in the second port buffer. In some of these embodiments the first statistical distribution is one of the set of a uniform random distribution, a truncated Normal random distribution, a truncated Poisson random distribution, and a truncated exponential random distribution.

According to another embodiment the test protocol processor is further configured to generate a second value according to a second statistical distribution if the first value is to another side of the first threshold; compare the second value to a second threshold; associate a delay with the first protocol message if the second value is to one side of the second threshold; and then to store the first protocol message in the second port buffer after the transpiring of the associated delay time.

In some of these embodiments the second statistical distribution is one of the set of a uniform random distribution, a truncated Normal random distribution, a truncated Poisson random distribution, and a truncated exponential random distribution. According to some of these embodiments the delay is chosen from a range of delays having a lower delay limit and an upper delay limit. Also, in some of these embodiments a chance of the delay being a particular delay is defined by a random distribution. For these embodiments, some of the random distributions may be one of a uniform random distribution, a truncated Normal random distribution, a truncated Poisson random distribution, and a truncated exponential random distribution.

According to another embodiment the test protocol processor is further configured to, prior to the store step: generate a third value according to a third statistical distribution; compare the third value to a third threshold; and associate a change in message contents with the first protocol message if the third value is to one side of the third threshold; provide the associated change in message contents to the first protocol message. In some of these embodiments the third statistical distribution is one of the set of a uniform random distribution, a truncated Normal random distribution, a truncated Poisson random distribution, and a truncated exponential random distribution.

According to another embodiment the test protocol processor is further configured to, prior to the return step: prior to the store step: generate a fourth value according to a fourth statistical distribution; compare the fourth value to a fourth threshold; and associate a change in message type with the first protocol message if the fourth value is to one side of the fourth threshold; provide the associated change in message type to the first protocol message. In some of these embodiments the associated change in message type is that of a failure message. In some of the embodiments, the fourth statistical distribution is one of the set of a uniform random distribution, a truncated Normal random distribution, a truncated Poisson random distribution, and a truncated exponential random distribution.

Advantageously, in some embodiments of the invention the predetermined message type is one of a plurality of predetermined message types.

According to another aspect of the invention there is disclosed a message compromiser having a first port having a first port buffer; a second port having a second port buffer; and a test protocol processor having access to the first and second port buffers; wherein the test protocol processor is configured to: generate a first value according to a first statistical distribution in the event that a first protocol message stored in the first port buffer corresponds to a predetermined message type; select a condition to apply to the first protocol message according to the first value. In some of these embodiments the first statistical distribution comprises a weighted value corresponding to the condition.

According to another embodiment of the invention the test protocol processor is further configured to, during the selecting step, select a condition from among the set of removing the first protocol message from the first port buffer, removing the first protocol message from the port buffer and replacing it in the second port buffer after a delay, removing the first protocol message from the first port buffer and replacing it in the second port buffer after altering the message payload contents, and removing the first protocol message from the first port buffer and replacing it in the second port buffer after altering the message type. According to some of these embodiments the delay is chosen from a range of delays having a lower delay limit and an upper delay limit. Also, in some of these embodiments a chance of the delay being a particular delay is defined by a random distribution. For these embodiments, some of the random distributions may be one of a uniform random distribution, a truncated Normal random distribution, a truncated Poisson random distribution, and a truncated exponential random distribution.

Note: in the following the description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

BRIEF DESCRIPTION OF THE DRAWINGS

The present invention will be further understood from the following detailed description of embodiments of the invention, with reference to the drawings in which:

FIG. 1 illustrates an exemplary Universal Mobile Telecommunications Services (UMTS) network for providing various mobile services;

FIG. 2 illustrates an exemplary Radio Network Controller (RNC) with associated communication ports;

FIG. 3 illustrates an exemplary field deployable message compromiser according to an embodiment of the invention;

DETAILED DESCRIPTION

Figure 4A:
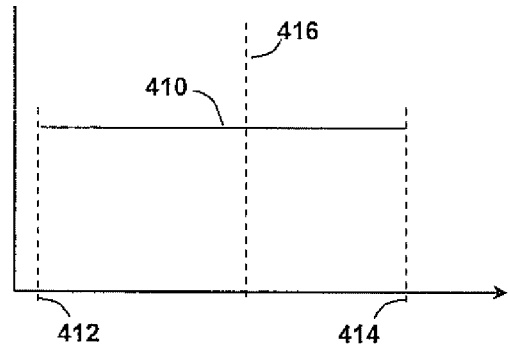
FIGS. 4a, 4b, 4c and 4d illustrates a set of exemplary statistical distributions used in generating a random value.

Referring now to the drawings, in which like numerals refer to like components or steps, there are disclosed broad aspects of various exemplary embodiments.

In use embodiments of the invention are situated connectively adjacent a piece of network equipment which acts as a node in a network of network equipment. Embodiments of the present invention provide a means for disrupting protocol messages received at the network element or transmitted from the network element.

In FIG. 1 there may be seen a simplified block diagram 100 of a portion of a Universal Mobile Telecommunications Services (UMTS) network. Within this network may be found examples of network equipment such as Radio Network Controllers (RNCs) 120 and 122; Mobile Service Switching Centre (MSC) 130; Serving GPRS Support Node 150; Home Location Register Node 140, Gateway Mobile Switching Center 160; and Gateway GPRS Support Node 170. The Radio Network Controllers are connected to base stations 110, in FIG. 1 RNC 120 to NodeB base stations 110a and 110b; and RNC 122 to NodeB base stations 110c and 110d. NodeB base stations can be in radio contact with user equipment 102, depicted in FIG. 1 as handsets 102a, 102b, 102c, and 102d.

In operation the network elements communicate via connections which bind the individual network element to other network elements to form the overall network. The interfaces between network elements terminate on ports of each individual network element. According to the protocol of the specific network, particular messages are exchanged between network elements over the connections in order to accomplish various network functions such as setting up a call, handing off a connection, connecting a particular user equipment to a particular service, etc.

Referring now to FIG. 2 there may be seen a block diagram depicting the ports associated with an example Radio Network Controller network element 200 corresponding to references 120 and 122 of FIG. 1. As per the UMTS specification, RNC 200 has a plurality of ports by which it interfaces connections to other network elements. For the purposes of this explanation, the logical connections between network elements will be termed interfaces. The interface between RNCs, for example RNC 220 and RNC 222 of FIG. 1 is termed the Iur interface and may be seen on FIG. 2 as port 210 of RNC 200. The interface between the RNC and the NodeB units is termed the Iub interface and may be seen on FIG. 2 as ports 220a, 220b, 220c, and 220d of RNC 200. The interface between the RNC and the Cell Broadcast Center (CBC) is termed the Iu-BC interface and may be seen as port 230 of RNC 200. The interface between the RNC and the Serving GPRS Support Node (SGSN) is termed the Iu-PS interface as may be seen as port 240 of RNC 200. The interface between the RNC and the Mobile Switching Center is termed the Iu-CS interface as may be seen as port 250 of RNC 200. Messages over an interface are transmitted and received at ports and will be stored in port buffer memories as discussed regarding the next figure.

Referring to FIG. 3 there may be seen a block diagram of an exemplary field deployable message compromiser 300 according to an embodiment of the invention.

Network element 320 has an interface port 322 connecting via communication link 340 to interface port 302 of message compromiser 300. Likewise, network element 340 has an interface port 342 connecting via communication link 350 to interface port 312 of message compromiser 300. Within message compromiser 300, interface port 302 is connected to port buffer 304, and messages arriving at interface input port 302 are stored in port buffer 304. Likewise, interface port 312 is connected to port buffer 3104, and messages destined for transmission from interface port 312 are stored in port buffer 314.

Also connected to port buffer 304 and port buffer 314 is test protocol processor 310. Test protocol processor 310 represents the hardware and hardware-with-software components of the message compromiser 300 which processes messages received at the interface ports and which generates messages for transmission from the interface ports according to the invention.

According to one embodiment of the invention, in operation test protocol processor 310 monitors port buffer 304 for messages stored therein from interface port 302. When such messages appear, test protocol process 310 removes the messages from port buffer 304. Subsequently, test protocol processor 310 may replace the removed message into port buffer 314. This replacement may occur immediately, or may occur after a delay. Under some circumstances test protocol processor 310 may alter the payload of the message and then replace the message; may alter the header of the message and then replace the message; or may not replace the message, effectively dropping the message.

The net result of each of these effects is to change the message, either in contents or in terms of arrival time, in order to examine the response of either network element 320, or network element 340, or the response of the larger network in which network elements 320 and 340 are nodes thereof. The nature of these changes allows testing of the network elements or the larger network in-situ with specifically prescribed message compromising instances. These message compromising instances may be representative of, for example, network delays which may occur in the normal course of network operation.

According to one embodiment of the invention, test protocol processor 310 may replace a particular message in the port input buffer after a delay chosen from a random distribution of delay times. This random distribution may have a defined lower limit and a defined upper limit representative of the range of delays that could be incurred for messages arriving at this port. Further, the random distribution of delay times could be defined by some standard statistical distribution including a uniform random distribution, a truncated Normal random distribution, a truncated Poisson random distribution, or a truncated exponential random distribution.

Referring to FIG. 4 there may be seen a variety of random statistical distributions. In FIG. 4a a uniform random distribution is depicted, having a delay range with a lower delay limit 412 and an upper delay limit 414 and having an instantaneous probability 410 throughout the range. A specific delay value 416 is depicted as might result from a delay selection according to this statistical distribution.

Figure 4B:
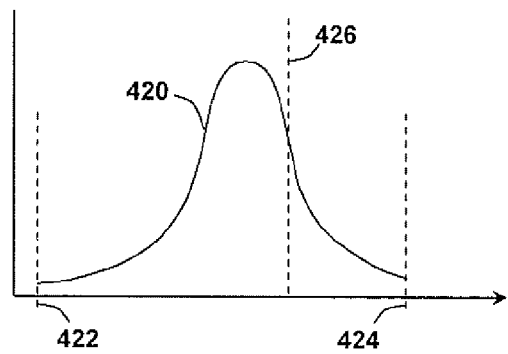

In FIG. 4b a truncated Normal random distribution is depicted, having a delay range with a lower delay limit 422 and an upper delay limit 424 and having an instantaneous probability 420 throughout the range. A specific delay value 426 is depicted as might result from a delay selection according to this statistical distribution.

Figure 4C:
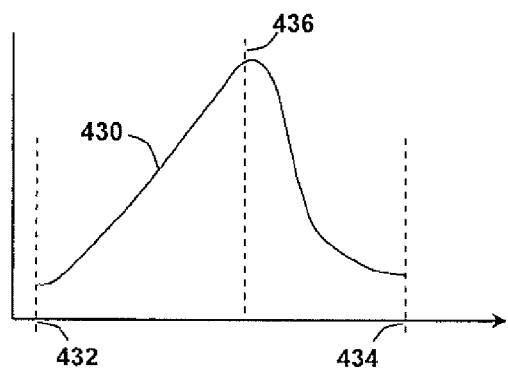

In FIG. 4c a truncated Poisson random distribution is depicted, having a delay range with a lower delay limit 432 and an upper delay limit 434 and having an instantaneous probability 430 throughout the range. A specific delay value 436 is depicted as might result from a delay selection according to this statistical distribution.

Figure 4D:
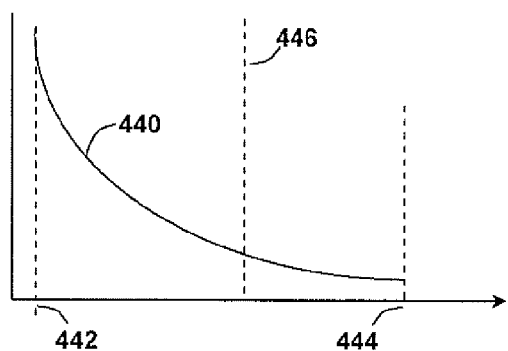

In FIG. 4d a truncated Exponential random distribution is depicted, having a delay range with a lower delay limit 442 and an upper delay limit 444 and having an instantaneous probability 440 throughout the range. A specific delay value 446 is depicted as might result from a delay selection according to this statistical distribution.

In application of these embodiments of the invention, the particular random statistical distribution may be chosen to represent the sort of distribution previously observed for messages in the particular network in which the network element of the invention is situated. Alternatively, the distribution may be chosen to demonstrate a particular performance response of the network element.

For example, under some circumstances it may be advantageous to select an appropriate distribution and then provide an upper limit representative of the average delay time. The resulting set of delays would be representative of messages arriving with delays at or below average. The response of the network element under test could be used to demonstrate the degree of impact on Key Performance Indicators that this particular network element contributes when the network is performing at average or below delay times.

According to another embodiment of the invention, the test protocol processor alters the payload of the message prior to returning the message to the input port buffer. This form of test could, for example, be used to evaluate the network element's response to erroneous content values contained in messages, in terms of recovery times and recovery paths taken.

Alternatively, according to another embodiment of the invention, the test protocol processor alters the message header, changing the message type. The alteration could be, for example, the substitution of a failure message in place of the received message. This form of test again could be used to evaluate the network element's response to failure messages, in terms of recovery times and recovery paths taken.

According to yet another embodiment of the invention, the test protocol processor does not return any message to the input port buffer. This form of test would represent the case where an incoming message was dropped.

Under one embodiment of the invention, the conditions under which the test protocol processor would remove a message from the input port buffer are defined in a reference table. The test protocol processor scans arriving messages and when a message corresponds to a message in the reference table, would remove the message from the input port buffer and take an action as correspondingly defined in the reference table. As aforementioned, the kind of actions could include delaying the particular message, changing the payload contents of the message, changing the message type, or even dropping the message. In some embodiments the reference table contains further particulars, for example if a delay is to be incurred by the message the reference table could detail a specific delay or a range of delays. The range could be specified by an upper and lower limit or could also or independently consist of a function reference to a particular type of random distribution with particular characteristics.

In operation the test protocol processor 310 is enabled as part of a testing scenario. The enabling could be via specific operator instructions or automatically in response to an automatic test routine.

The net result of each of these effects is to change the message, either in contents or in terms of arrival time, or in terms of failure to arrive, in order to examine the response of the network element adjacent to message compromiser 300, and additionally the response of the larger network in which the network elements adjacent to message compromiser 300 are nodes thereof.

As per normal network test procedures, responses of the network elements 320 and 340 and interacting network elements would be captured in a trace file and logged in a database for later analysis.

According to another embodiment of the invention the operation of the test protocol processor is made dependent upon a random statistic in the event that it identifies a predetermined message. The application of the random statistic may occur once or multiple times in determining what operation the test protocol process will take. According to one version of this embodiment, a value is determined according to a random or pseudo-random process. The value is then compared to a threshold value. If the determined value is to one side of the threshold value, for example greater than the threshold value, then the operation of the test protocol processor may be to ignore the presence of the predetermined message in this instance. In the event that the determined value is equal or to the other side of the threshold value, then the operation of the test protocol processor may be to remove the message from the port buffer. In this embodiment a random statistic is used to establish the frequency of the test protocol processor interacting with the port buffer in the event that a predetermined message type is placed in the buffer. In this embodiment the random statistic determines whether a message is removed from the port buffer at all, thus potentially curtailing the addition of delays or modification of the message.

According to another embodiment of the invention, the provision of a delay is made contingent upon a random statistic. According to one version of this embodiment, a value is determined according to a random or pseudo-random process. The value is then compared to a threshold value. If the determined value is to one side of the threshold value, for example greater than the threshold value, then the operation of the test protocol processor may be to remove the message from the port buffer and return the message after some determined delay. In some versions of this embodiment the delay may be a particular fixed value, while in other versions the delay period may be determined by choosing a delay from a random distribution of delay times. This random distribution may have a defined lower limit and a defined upper limit representative of the range of delays that could be incurred for messages arriving at this port. Further, the random distribution of delay times could be defined by some standard statistical distribution including a uniform random distribution, a truncated Normal random distribution, a truncated Poisson random distribution, or a truncated exponential random distribution.

According to another embodiment of the invention the operation of the test protocol processor is made dependent upon a random statistic in the event that it identifies a predetermined message. According to one version of this embodiment, a value is determined according to a random or pseudo-random process. The value is then compared to a threshold value. If the determined value is to one side of the threshold value, for example greater than the threshold value, then the operation of the test protocol processor may be to remove the message from the port buffer and return the message after modifying the payload of the message.

According to another embodiment of the invention the operation of the test protocol processor is made dependent upon a random statistic in the event that it identifies a predetermined message. According to one version of this embodiment, a value is determined according to a random or pseudo-random process. The value is then compared to a threshold value. If the determined value is to one side of the threshold value, for example greater than the threshold value, then the operation of the test protocol processor may be to remove the message from the port buffer and return the message after modifying the payload of the message. Alternatively this operation may be triggered by the determined value being equal to or to the other side of the threshold value, for example less than or equal to the threshold value.

According to yet another embodiment of the invention the operation of the test protocol processor is made dependent upon a random statistic in the event that it identifies a predetermined message. According to one version of this embodiment, a value is determined according to a random or pseudo-random process. The value is then compared to a threshold value. If the determined value is to one side of the threshold value, for example greater than the threshold value, then the operation of the test protocol processor may be to remove the message from the port buffer and return the message after modifying the header of the message. This operation would be used in conjunction with changing the message type, for example to that of a failure message. Alternatively this operation may be triggered by the determined value being equal to or to the other side of the threshold value, for example less than or equal to the threshold value.

According to an embodiment of the invention, a series of tests are made against a random or pseudo-random statistic and the cumulative results of the individual tests determine in sum what operations the test protocol processor performs on a message in a port buffer.

Figure 5:
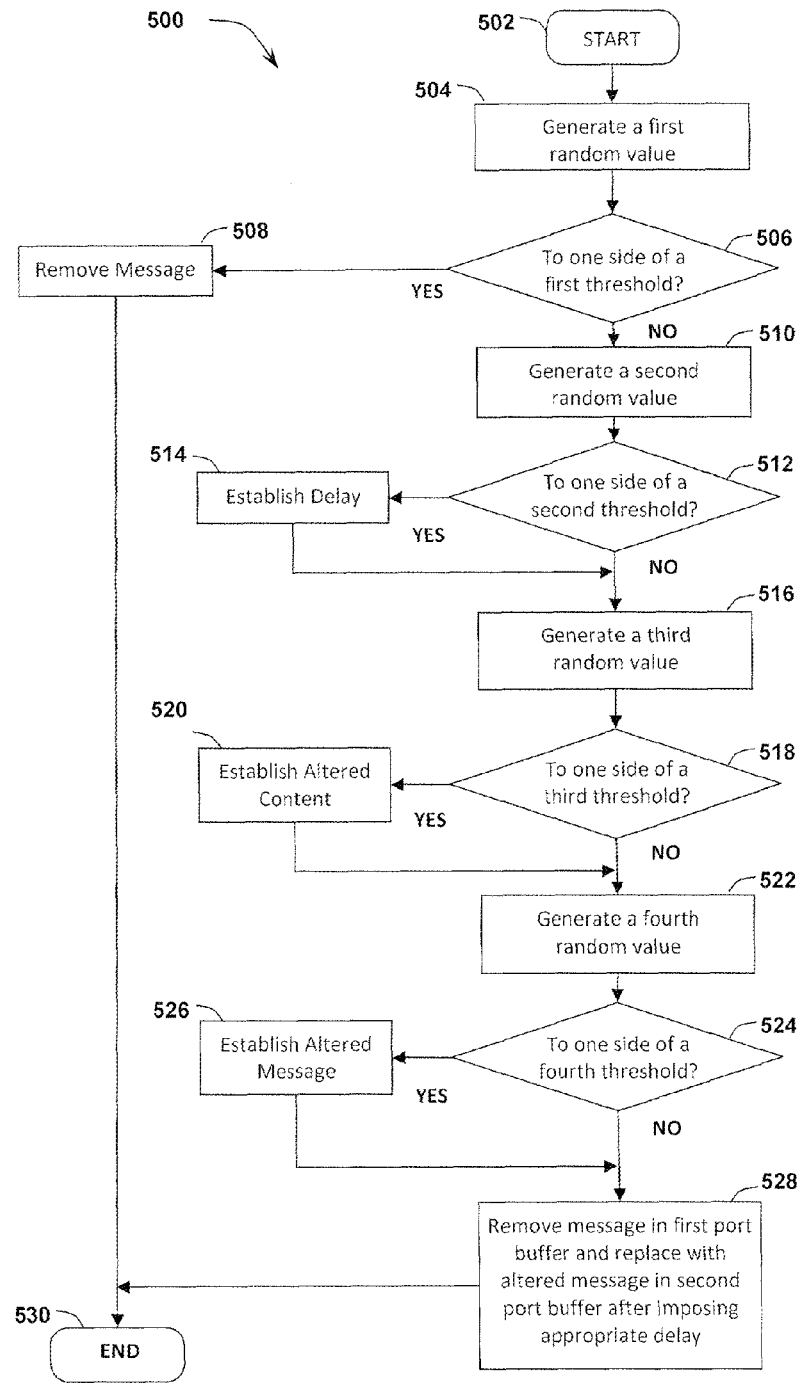
FIG. 5 illustrates a process flow diagram according to an embodiment of the invention.

By way of example, and referring now to FIG. 5 there may be seen a process flow diagram 500 providing a method according to a version of this embodiment of the invention.

The process commences at step 502. At step 504 a first random value is generated. This first generated value is compared to a first reference threshold at step 506 and if the first random value is to one side of the first reference threshold, then control proceeds to step 508 where the message is removed from the port buffer. Control then proceeds to step 530 where the process ends. This particular path through the process would represent an instance where a message would be removed from the port buffer and dropped.

In the event that step 506 determined that the first random value was to the other side or equal to the first threshold, control proceeds from step 506 to step 510 where a second random value is generated. This second generated value is compared to a second reference threshold at step 512 and if the second random value is to one side of the second reference threshold, then control proceeds to step 514 where a particular delay is established. This delay may be established via reference to a reference table or may be a delay generated from a statistical distribution, for example any distributions of the forms described in FIG. 4. Control then proceeds to step 516.

In the event that step 512 determined that the second random value was to the other side or equal to the second threshold, control proceeds from step 512 to step 516. At step 516 a third random value is generated. This third generated value is compared to a third reference threshold at step 518 and if the third random value is to one side of the third reference threshold, then control proceeds to step 520 where a particular altered content for the message is established. Control then proceeds to step 522.

In the event that step 518 determined that the third random value was to the other side or equal to the third threshold, control proceeds from step 518 to step 522. At step 522 a fourth random value is generated. This fourth generated value is compared to a fourth reference threshold at step 524 and if the fourth random value is to one side of the fourth reference threshold, then control proceeds to step 526 where a particular altered header for the message is established. The altered header will change the message type. In some cases the message type could be changed to that of a failure message. Control then proceeds to step 528.

In the event that step 524 determined that the fourth random value was to the other side or equal to the fourth threshold, control proceeds from step 524 to step 528.

At step 528 the message in the first port buffer is removed and stored in the second port buffer with the altered message resulting from steps 520 and 526 after imposing the particular delay determined at step 514. Note that the resulting replacement message may incur only a delay, only a payload contents alteration, only a header alteration, or any combination of these conditions, dependent upon the random values generated and the results of the test steps. Control then proceeds to step 530 where the process ends.

Accordingly, this embodiment of the invention uses a cascaded set of tests using random distributions to determine what alterations and delays are to be imposed upon a particular message. This embodiment may find preferable application wherein the statistical distributions for the frequency of a dropped message, a delayed message, a message with altered contents, and a message with altered type are known and different. As each statistical distribution is independently applied, this embodiment allows individual adjustment of the distributions determining the application of the particular condition.

Figure 6:
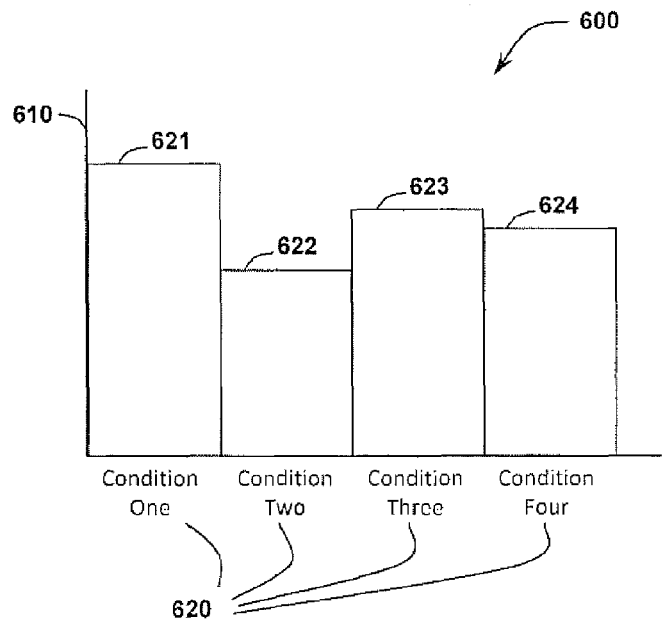
FIG. 6 illustrates a weighted statistical distribution according to an embodiment of the invention.

According to a different embodiment of the invention, a different form of determination according to a random distribution is used. Referring now to FIG. 6 there may be seen a distribution 600 having a statistical likelihood value as per axis 610 and distinct likelihoods 621, 622, 623, and 624. These distinct likelihoods are each respectively associated with conditions 620. In operation the distribution 600 defines the likelihood that one of the particular conditions would be applied to a given predetermined message. For example, condition one could represent the case of dropping the message and have a likelihood of 25%. Condition two could represent the case of delaying the message and have a likelihood of 20%. Condition three could represent the case of altering the message contents and have a likelihood of 26%. Condition four could represent the case of altering the message header (message type) and have a likelihood of 24%.

In this embodiment a single statistical distribution, distribution 600, is used to determine which condition will be applied to the message. Due to the separate conditions specified in distribution 600, only one of the conditions will be applied to a predetermined message in this embodiment.

Figure 7:
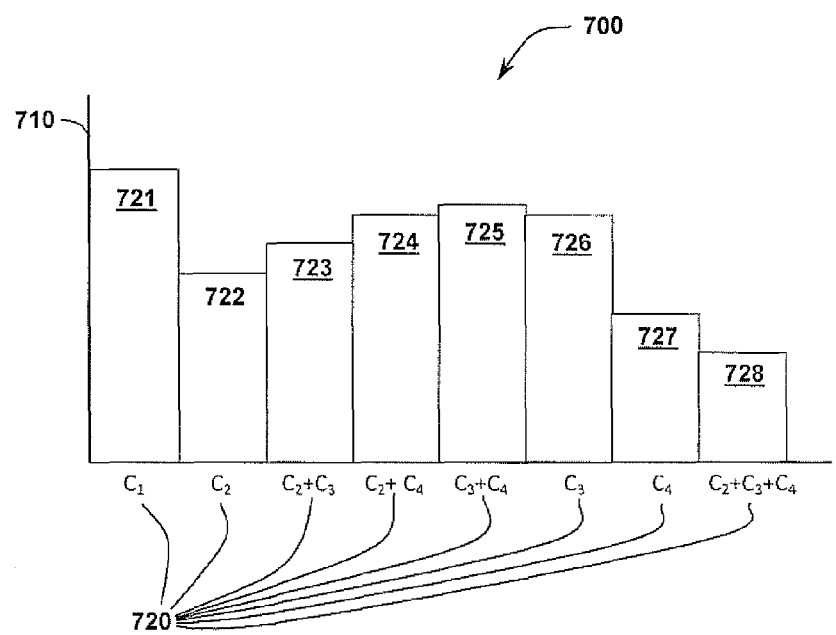
FIG. 7 illustrates a weighted statistical distribution according to a different embodiment of the invention.

Referring to FIG. 7 there is depicted an alternate statistical distribution 700 which provides for a single statistical distribution allowing multiple conditions to be applied to a replacement message. In FIG. 7 there may be seen a distribution 700 having a statistical likelihood value as per axis 710 and distinct likelihoods 721, 722, 723, 724, 725, 726, 727, and 728. These distinct likelihoods are each respectively associated with situations 720. Each situation of situations 720 is associated with the application of one or more conditions, and each situation is associated with a respective likelihood. By way of example, allow condition $C_1$ to represent dropping a message, $C_2$ to represent delaying a message, $C_3$ to represent altering a message contents, and $C_4$ to represent altering a message's header or message type. Then, likelihood 721 which corresponds to $C_1$ is the likelihood of dropping a message according to distribution 700. Likewise, likelihood 722 which corresponds to $C_2$ is the likelihood of simply delaying a message according to distribution 700, while likelihood 723 which corresponds to conditions $(C_2+C_3)$ is the likelihood of both delaying a message and altering the message's payload, and likelihood 728 which corresponds to conditions $(C_2+C_3+C_4)$ is the likelihood of delaying a message and altering the message's payload contents and type. In operation the distribution 700 defines the likelihood that one particular set of combinations of the particular conditions would be applied to a given predetermined message.

In this embodiment a single statistical distribution, distribution 700, is used to determine which set of conditions will be applied to the message. Due to the separate situations specified in distribution 700, each particular combinatorial set of the conditions can have a separate likelihood assigned.

Figure 8:
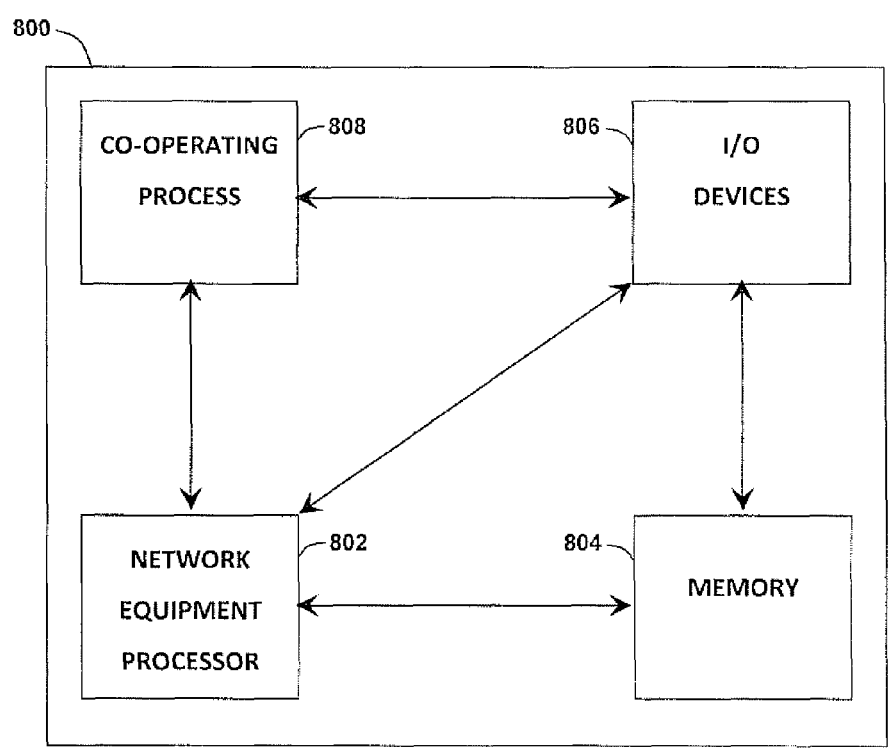
FIG. 8 illustrates an exemplary network element protocol processor assembly according to an embodiment of the invention.

FIG. 8 depicts a high-level block diagram of a network equipment protocol processor assembly suitable for use in performing functions described herein.

As depicted in FIG. 8, network equipment protocol processor assembly 800 includes a network equipment processor element 802 (e.g., a central processing unit (CPU) and/or other suitable processor(s)), a memory 804 (e.g., random access memory (RAM), read only memory (ROM), and the like), a cooperating module/process 808, and various input/output devices 806 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in hardware, for example using one or more application specific integrated circuits (ASIC), and/or any other hardware equivalents. Alternatively, according to one embodiment, the cooperating process 808 can be loaded into memory 804 and executed by network equipment processor 802 to implement the functions as discussed herein. As well, cooperating process 808 (including associated data structures) can be stored on a tangible, non-transitory computer readable storage medium, for example magnetic or optical drive or diskette, semiconductor memory and the like.

Accordingly, what has been disclosed is an apparatus and associated method which provides for the statistical control of the removal of messages from port buffers and subsequent dropping, delaying or alteration of the messages prior to their return to the port buffer. According to some embodiments of the invention the statistical control is performed on an event by event basis by making separate statistical determinations as to whether a message drop, message delay, message payload change or message header or type change occurs. According to other embodiments a single test is made against a predetermined distribution which defines the likelihoods of a single condition being applied. In other embodiments a single test is made against a predetermined distribution which defines the likelihoods of particular combinations of conditions being applied. In all the embodiments, in the event that the port buffer is an input port buffer, the message removal, alteration and replacement (if the message is not dropped) is done prior to the standard protocol processor of the network element having retrieved the message from the input port buffer. In the event that the port buffer is an output port buffer, the message removal, alteration and replacement (if the message is not dropped) is done prior to the message being transmitted from the output port buffer. Thus, what has been provided is a method to test a network element in situ in a customer network. In particular, a means has been disclosed by which the response of a particular network element to a plurality of problematic messaging conditions could be demonstrated under predetermined statistical regimes.

It is contemplated that some of the steps discussed herein as methods may be implemented within hardware, for example, as circuitry that cooperates with the network equipment processor to perform various method steps. Portions of the functions/elements described herein may be implemented as a computer program product wherein computer instructions, when processed by a network equipment processor, adapt the operation of the network equipment processor such that the methods and/or techniques described herein are invoked or otherwise provided. Instructions for invoking the inventive methods may be stored in fixed or removable media, and/or stored within a memory within a computing device operating according to the instructions. It is to be understood that various changes in the details, materials, and arrangements of the parts which have been described and illustrated in order to explain the nature of this invention may be made by those skilled in the art without departing from the scope of the invention as expressed in the following claims.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation." Numerous modifications, variations and adaptations may be made to the embodiment of the invention described above without departing from the scope of the invention, which is defined in the claims.

What is claimed is:

1. A field-deployable message compromiser comprising:
   a first port having a first port buffer;
   a second port having a second port buffer; and
   a test protocol processor having access to said first and second port buffers;
   wherein said test protocol processor is configured to:
      in the event that a first protocol message is stored in said first port buffer, remove said first protocol message from said first port buffer;
      generate a first value according to a first statistical distribution in the event said first protocol message corresponds to a predetermined message type;
      compare said first value to a first threshold; and
      when said first value exceeds said first threshold, immediately store said first protocol message in said second port buffer.

2. The message compromiser of claim 1 wherein said test protocol processor is further configured to:
   generate a second value according to a second statistical distribution if said first value does not exceed said first threshold;
   compare said second value to a second threshold;
   associate a delay with said first protocol message if said second exceeds of said second threshold; and
   then to store said first protocol message in said second port buffer after the transpiring of said associated delay time.

3. The message compromiser of claim 2 wherein said test protocol processor is further configured to, prior to said store step:
   generate a third value according to a third statistical distribution;
   compare said third value to a third threshold; and
   associate a change in message contents with said first protocol message if said third value exceeds said third threshold;
   provide said associated change in message contents to said first protocol message.

4. The message compromiser of claim 3 wherein said test protocol processor is further configured to, prior to said store step:
   generate a fourth value according to a fourth statistical distribution;
   compare said fourth value to a fourth threshold; and
   associate a change in message type with said first protocol message if said fourth value exceeds said fourth threshold;
   provide said associated change in message type to said first protocol message.

5. The message compromiser of claim 4 wherein
   said associated change in message type is that of a failure message.

6. The message compromiser of claim 4 wherein
   said fourth statistical distribution is one of the set of a uniform random distribution, a truncated Normal random distribution, a truncated Poisson random distribution, and a truncated exponential random distribution.

7. The message compromiser of claim 3 wherein
   said third statistical distribution is one of the set of a uniform random distribution, a truncated Normal random distribution, a truncated Poisson random distribution, and a truncated exponential random distribution.

8. The message compromiser of claim 2 wherein
said delay is chosen from a range of delays having a lower delay limit and an upper delay limit.

9. The message compromiser of claim 8 wherein
a chance of said delay being a particular delay is defined by a random distribution.

10. The message compromiser of claim 9 wherein
the random distribution is one of the set of a uniform random distribution, a truncated Normal random distribution, a truncated Poisson random distribution, and a truncated exponential random distribution.

11. The message compromiser of claim 2 wherein
said second statistical distribution is one of the set of a uniform random distribution, a truncated Normal random distribution, a truncated Poisson random distribution, and a truncated exponential random distribution.

12. The message compromiser of claim 1 wherein
said first statistical distribution is one of the set of a uniform random distribution, a truncated Normal random distribution, a truncated Poisson random distribution, and a truncated exponential random distribution.

13. The message compromiser of claim 1 wherein
said predetermined message type is one of a plurality of predetermined message types.

14. A message compromiser comprising:
a first port having a first port buffer;
a second port having a second port buffer; and
a test protocol processor having access to said first and second port buffers;
wherein said test protocol processor is configured to:
generate a first value according to a first statistical distribution in the event that a first protocol message stored in said first port buffer corresponds to a predetermined message type;
select a condition to apply to said first protocol message according to said first value, wherein, selecting a condition further comprises selecting a condition from among the set of removing said first protocol message from said first port buffer, removing said first protocol message from said port buffer and replacing it in said second port buffer after a delay, removing said first protocol message from said first port buffer and replacing it in said second port buffer after altering the message payload contents, and removing said first protocol message from said first port buffer and replacing it in said second port buffer after altering the message type.

15. The message compromiser of claim 14 wherein the message type is altered to that of a failure message.

16. The message compromiser of claim 15 wherein
said delay is chosen from a range of delays having a lower delay limit and an upper delay limit.

17. The message compromiser of claim 16 wherein
a chance of said delay being a particular delay is defined by a random distribution.

18. The message compromiser of claim 17 wherein
the random distribution is one of the set of a uniform random distribution, a truncated Normal random distribution, a truncated Poisson random distribution, and a truncated exponential random distribution.

19. The message compromiser of claim 17 wherein
the first statistical distribution comprises a weighted value corresponding to said condition.

* * * * *